United States Patent [19]

Hartwig

[11] 4,272,808

[45] Jun. 9, 1981

[54] DIGITAL GRAPHICS GENERATION SYSTEM

[75] Inventor: William F. Hartwig, St. Paul, Minn.

[73] Assignee: Sperry Corporation, New York, N.Y.

[21] Appl. No.: 40,610

[22] Filed: May 21, 1979

[51] Int. Cl.[3] ........................ G06F 3/153; G06F 15/31

[52] U.S. Cl. .................................... 364/718; 340/739; 364/521; 364/719; 364/720

[58] Field of Search ............... 364/520, 521, 718, 719, 364/720, 851; 340/730, 739, 743

[56] References Cited

U.S. PATENT DOCUMENTS

| | | | |
|---|---|---|---|
| 3,254,203 | 5/1966 | Kveim | 364/718 |
| 3,652,839 | 3/1972 | Maekawa et al. | 364/718 |
| 3,917,932 | 11/1975 | Saita et al. | 364/718 |
| 4,023,027 | 5/1977 | Strathman et al. | 364/720 |

*Primary Examiner*—Jerry Smith

*Attorney, Agent, or Firm*—Douglas L. Tschida; Kenneth T. Grace; William E. Cleaver

[57] ABSTRACT

A real time digital graphics display system is disclosed for generating circles, arcs and vectors. The system utilizes Taylor's formula to determine the successive coordinates of the points along the image of the character displayed. The system is able to display a given graphical character once given the coordinates of a start point, an end point and the number of increments to be displayed if an arc is to be displayed.

6 Claims, 8 Drawing Figures

DIGITAL GRAPHICS GENERATION SYSTEM

BACKGROUND OF THE INVENTION

The present invention relates to digital graphics display systems and more particularly to a real time system for displaying vectors, circles and arcs from a known starting point. Previous systems have their basis in trigonometric relationships requiring the dedicated processing of data and adjustment for rounding errors as in table look-up approaches. The present system, however, enables the presentation of graphics in real time without the aid of a processor unit by performing only additions, subtractions and comparisons to determine the coordinates of the resolution points comprising the displayed graphical character. The system is recursive and is adaptable to either a raster scan or beam position (stroke) monitor.

SUMMARY OF THE INVENTION

A digital graphics display system is disclosed for recursively performing real time graphics generation. The circuit design is compatible with Schottky TTL logic circuitry and can be implemented in a raster scan or stroke monitor system.

The graphic characters are obtained upon defining the start and end point coordinates of the character (i.e., vector, circle or arc) to be displayed. Given this information the graphics generator employs Taylor's formula to recursively calculate and compare the magnitude of the formula at the coordinates of three resolution points to determine the coordinates of the resolution point having the smallest magnitude and thus determine the coordinates of the resolution points comprising the character. Upon determination of each successive resolution point, the corresponding digital x and y coordinates are converted to corresponding analog signals and the analog signals are used to drive the deflection or control circuitry of the display monitor and thus display the character on the monitor.

DESCRIPTION OF THE PREFERRED EMBODIMENT

Figure 1:
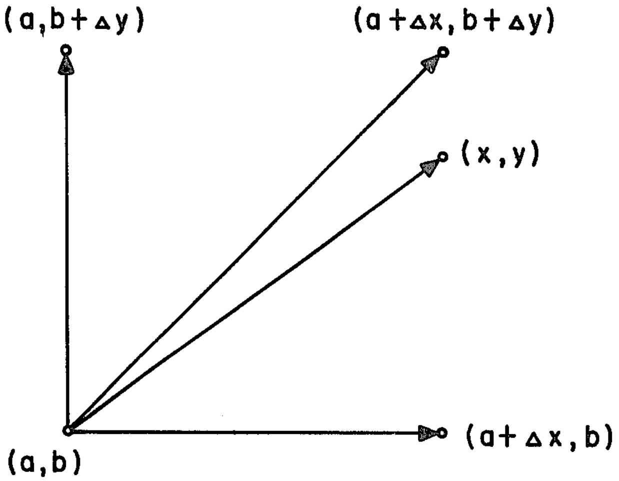
FIG. 1 is a coordinate representation of an incremental unit showing the relative relationships between a start point, the incremental resolution points and a point on the character's function.

The present invention teaches a display system capable of generating graphics information using Taylor's formula with remainder as defined in *College Calculus with Analytic Geometry,* M. H. Protter and G. B. Morrey, Jr., Addison-Wesley Publishing Co., pp. 697, 698, 1964. In the general case the formula for an infinitely, partially differentiable function, f(x, y), can be represented mathematically on a continuous interval as $$f(x,y) = f(a,b) + \sum_{Q=1}^{P} \frac{1}{Q!}\left[\sum_{r=0}^{Q} \frac{Q!}{(Q-r)!r!} \frac{\partial^{Q} f(a,b)}{\partial_x^{Q-r}\,\partial_y^{r}} (x-a)^{Q-r}(y-b)^{r}\right] + R_p$$

for all points on the interval joining the points (a, b) and (x, y).

In particular for the specific cases of a circle and a vector, the corresponding functions can be expanded and reduced as follows:

Circle: $f(x, y)=x^2+y^2-R^2=0$ applying Taylor's formula f(x, y) reduces to $f(x, y)=f(a, b)+2x(x-a)+-2y(y-b)+(x-a)^2+(y-b)^2=0$ Vector: $f(x, y)=Ye\,x-Xe\,y=0$, applying Taylor's formula f(x, y) reduces to $f(x, y)=f(a, b)+Ye(x-a)+Xe(y-b)=0$ It is to be recognized that Taylor's formula is dependent on the interval and therefore as the interval is reduced, the expansion more closely approximates the function for the individual character.

The formula is particularly adaptable to digital graphics displays since a display monitor's viewing screen, whether a stroke or raster scan monitor, can be segmented in a matrix fashion to any number of displayable resolution points. The total number of resolution points being primarily dependent on the available hardware dedicated to graphics generation. Taylor's formula specifically facilitates the display of vectors, arcs and circles, since the determination of the coordinates of the character's successive resolution points is reduced to a series of additions and subtractions with a subsequent comparison of the magnitude of the formula at a number of resolution points to determine least magnitude and thereby determine the coordinates of each successive resolution point of the displayed image. Graphics data can therefore be generated in real time using available hardware from the expansion of an f(x, y) about a given starting point.

In the present display system, the graphics are displayed on the screen of a stroke monitor having a defined resolution of 1024×1024 display points. The distance between points corresponding to increments of approximately 0.01 inches. Dividing the screen in this manner requires 10 bits of data to define each x and each y coordinates for each resolution point. By providing zoom (i.e., magnification) capabilities of 2×, 4× and 8×, the hardware capacity requirement is increased to 14 bits of data for each x and y coordinate and the display resolution is increased to 8,192×8,192 display points, since the zoom feature requires the shifting of data one place for each power of 2 increase in the display magnitude.

The present stroke monitor system is implemented in Schottky TTL logic circuitry and the x and y coordinates of each new resolution point are determined approximately every 200 nanoseconds. At the monitor's 60 Hz refresh rate, this translates to the system's ability to fill approximately 8% of the resolution points on the CRT screen with graphics characters. The graphics generation circuitry is recursive and once the control information defining what character is to be displayed (vector, arc or circle); where the character is to be displayed (location on the CRT); and how the character is to be displayed (zoom, solid, dashed, blinking and intensity) is available, the circuitry continues to generate the x and y coordinates of each successive resolution point until the character is completed. The primary control information required, however, are the coordinates of the starting point and end point for a vector; the center and a point on the circumference for a circle; and the center, a point on the circumference and the number of display increments for an arc.

Referring to FIG. 1 the generation of the coordinates of each resolution point on the character displayed proceeds from an initial or current start point (a, b) in the following manner:

(1) Calculating the magnitude of the Taylor's expansion of f(x, y) at each of the four points (a, b), $(a+\Delta x, b)$, $(a, b+\Delta y)$ and $(a+\Delta x, b+\Delta y)$, where $\Delta x=\pm 1$ and $\Delta y=\pm 1$ depending on the sign of the coordinates of the end point $(x_e, y_e)$ for a vector and on the running coordinates of (x, y) for a circle or are;

(2) Comparing the magnitudes at $(a+\Delta x, b)$, $(a, b+\Delta y)$ and $(a+\Delta x, b+\Delta y)$ to determine that magnitude which is the smallest, since $f(x, y)=0$ if the point is on the function.

(3) Updating the system to a new start point corresponding to the point determined to have the smallest magnitude by the comparison.

Figure 3:
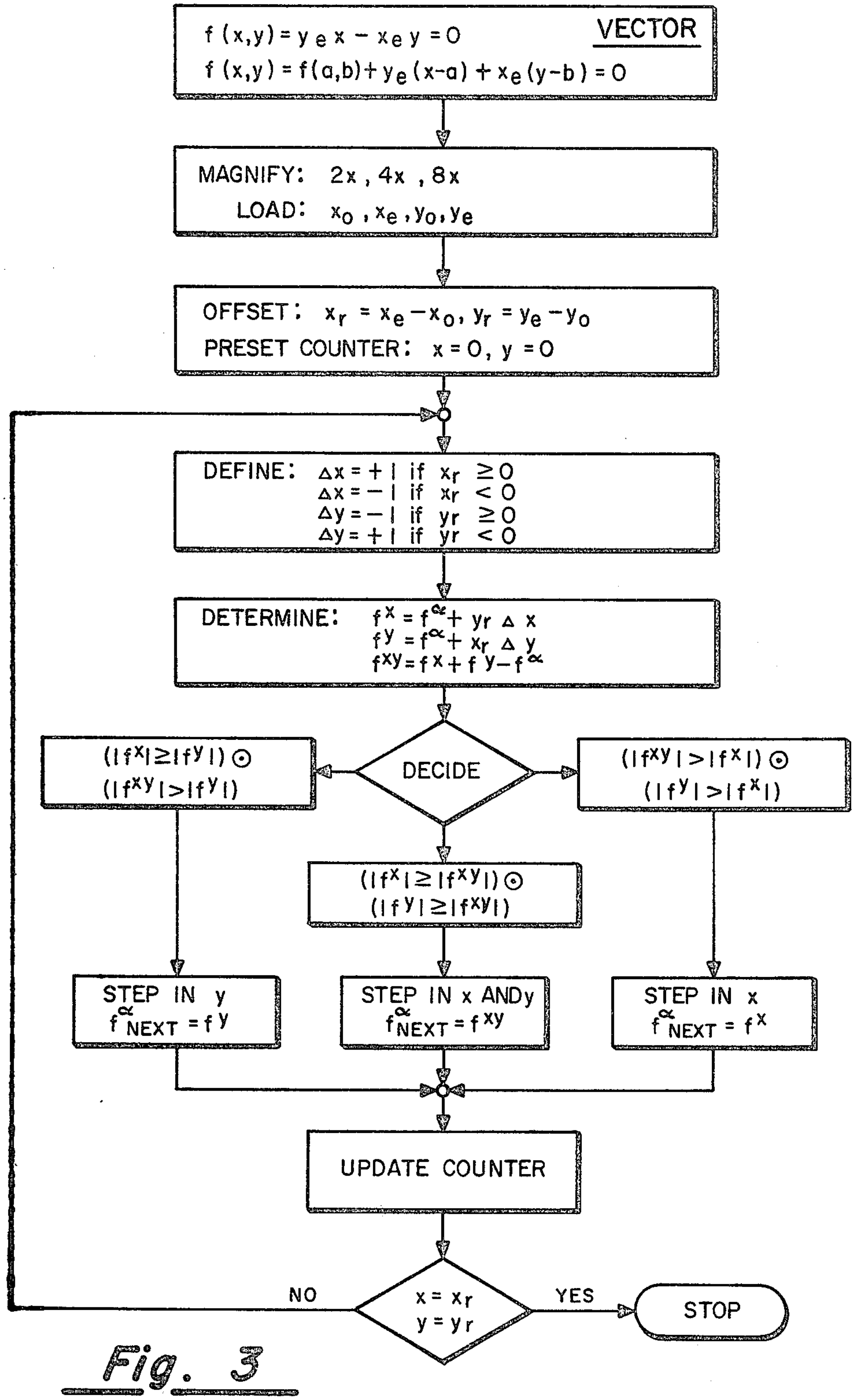
FIG. 3 is a flow diagram of the generator's operation for recursively generating the resolution points comprising a vector.
Figure 4:
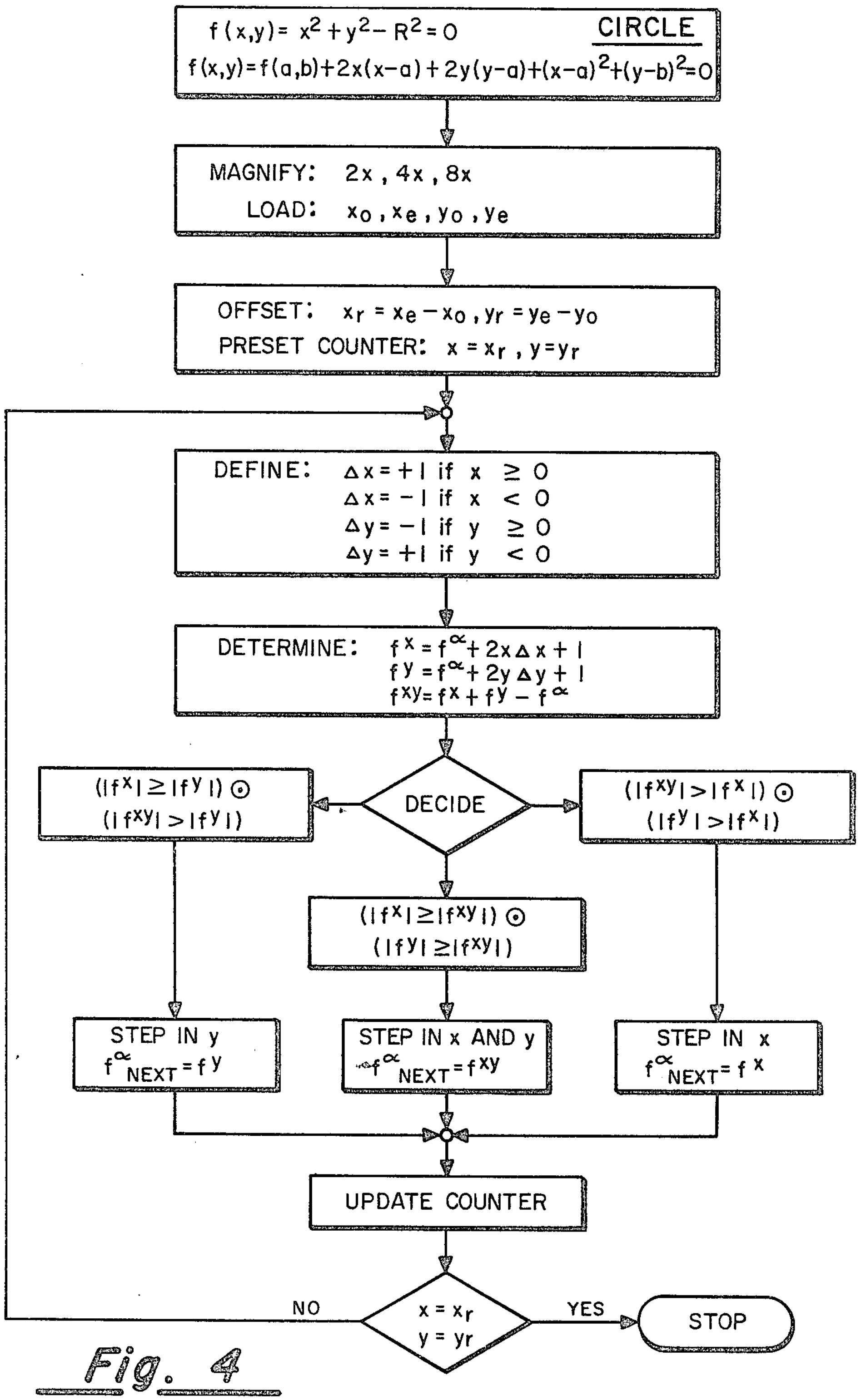
FIG. 4 is a flow diagram of the generator's operation for recursively generating the resolution points comprising a circle.
Figure 5:
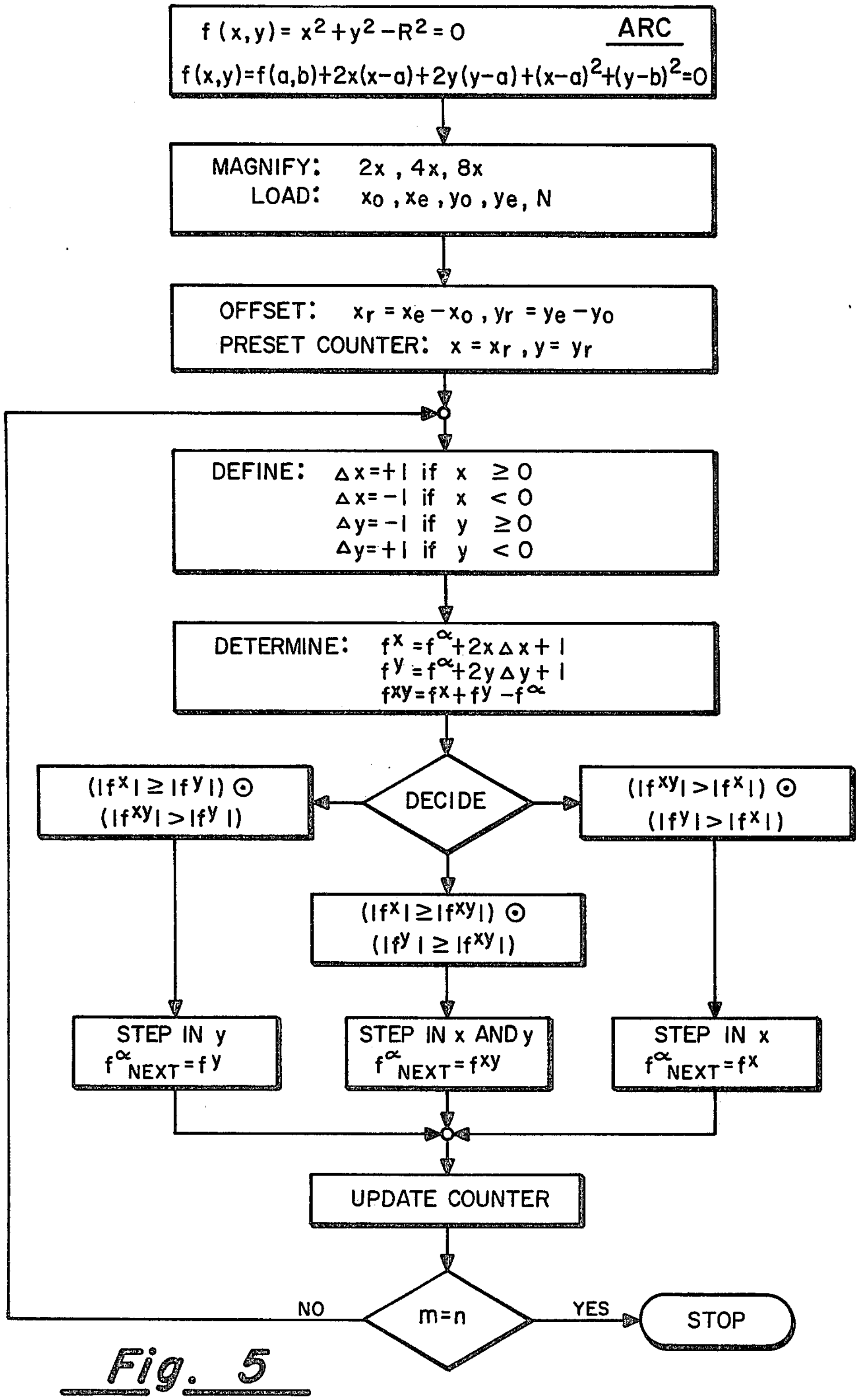
FIG. 5 is a flow diagram of the generator's operation for recursively generating the resolution points comprising an arc.

Applying the procedure to the specific cases of a vector, circle and an arc results in the flow diagrams of FIGS. 3, 4 and 5 and the decision variables $f^x$, $f^y$ and $f^{xy}$.

It is to be recognized, however, that as each new start point is calculated from the preceding point some error will accrue with each successive update. The error is nominal though since the display resolution is sufficiently high. It is also to be recognized that because the system is recursive, time is saved in that after the initial four calculations of $f^\alpha$, $f^x$, $f^y$ and $f^{xy}$, the new $f^\alpha$ will correspond to the Taylor's expansion at the selected one of the previous resolution points. It is also to be further noted that $f^\alpha$ at the initial start point will be equal to zero for each of the characters generated.

Figure 2:
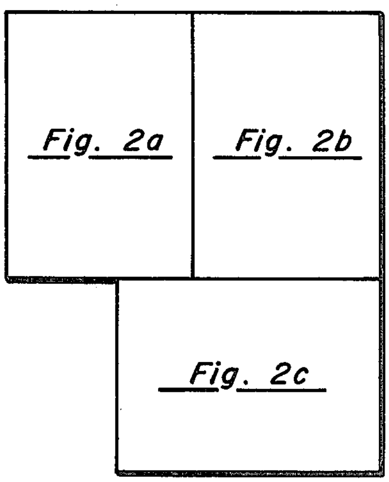
FIG. 2 comprising
Figure 2A:
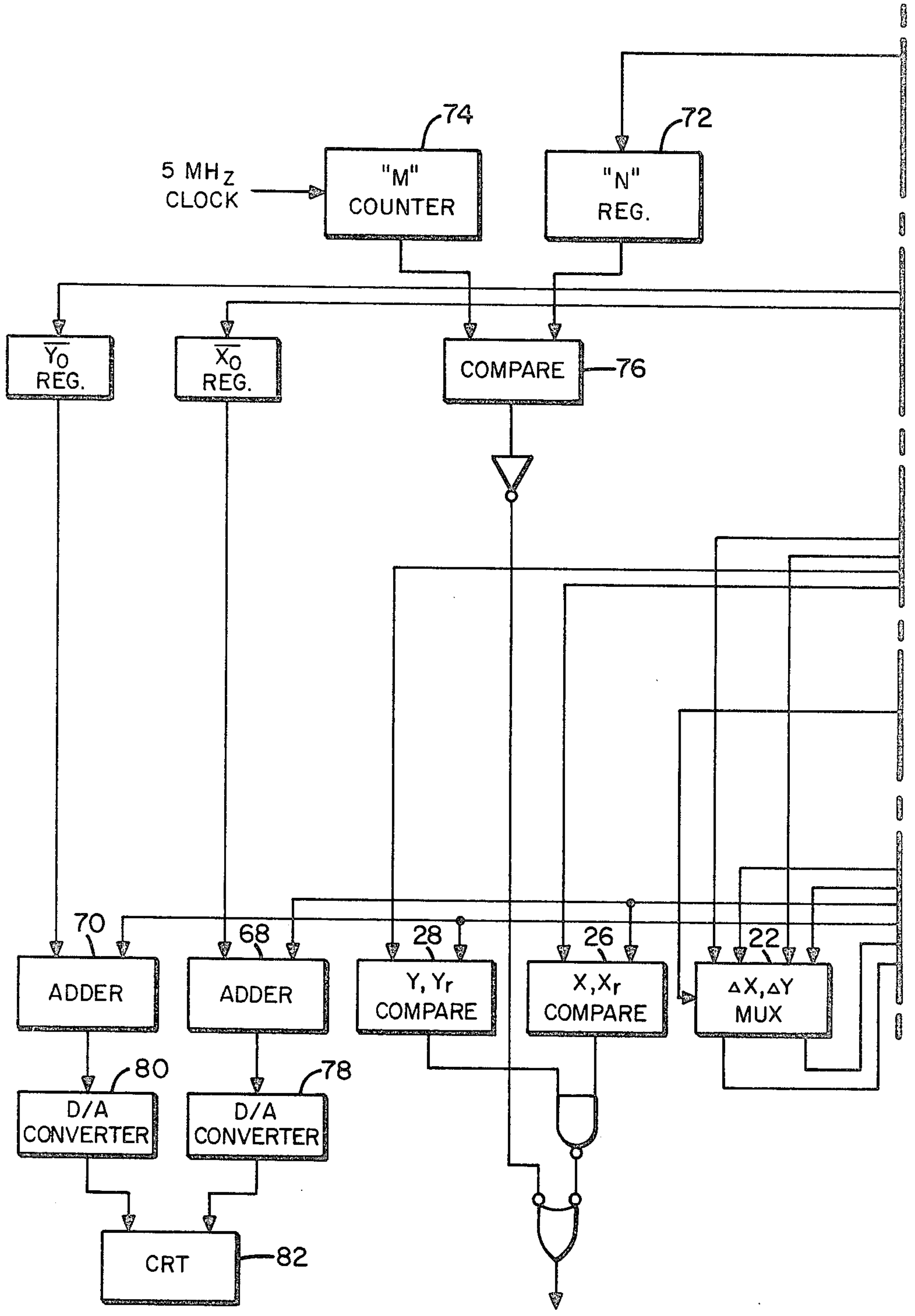
FIGS. 2*a*, 2*b* and 2*c* is the circuit schematic of the display system.
Figure 2B:
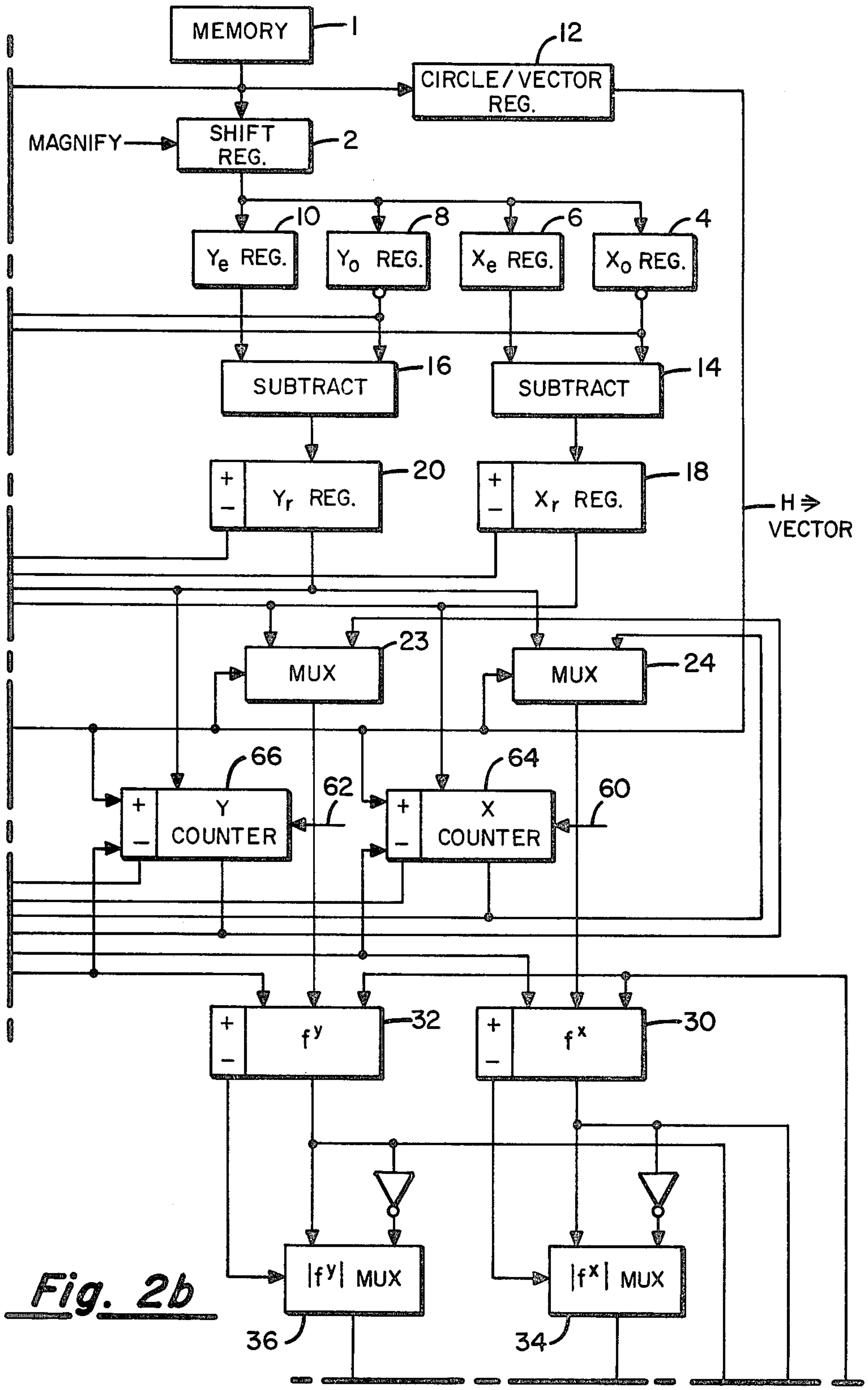
Figure 2C:
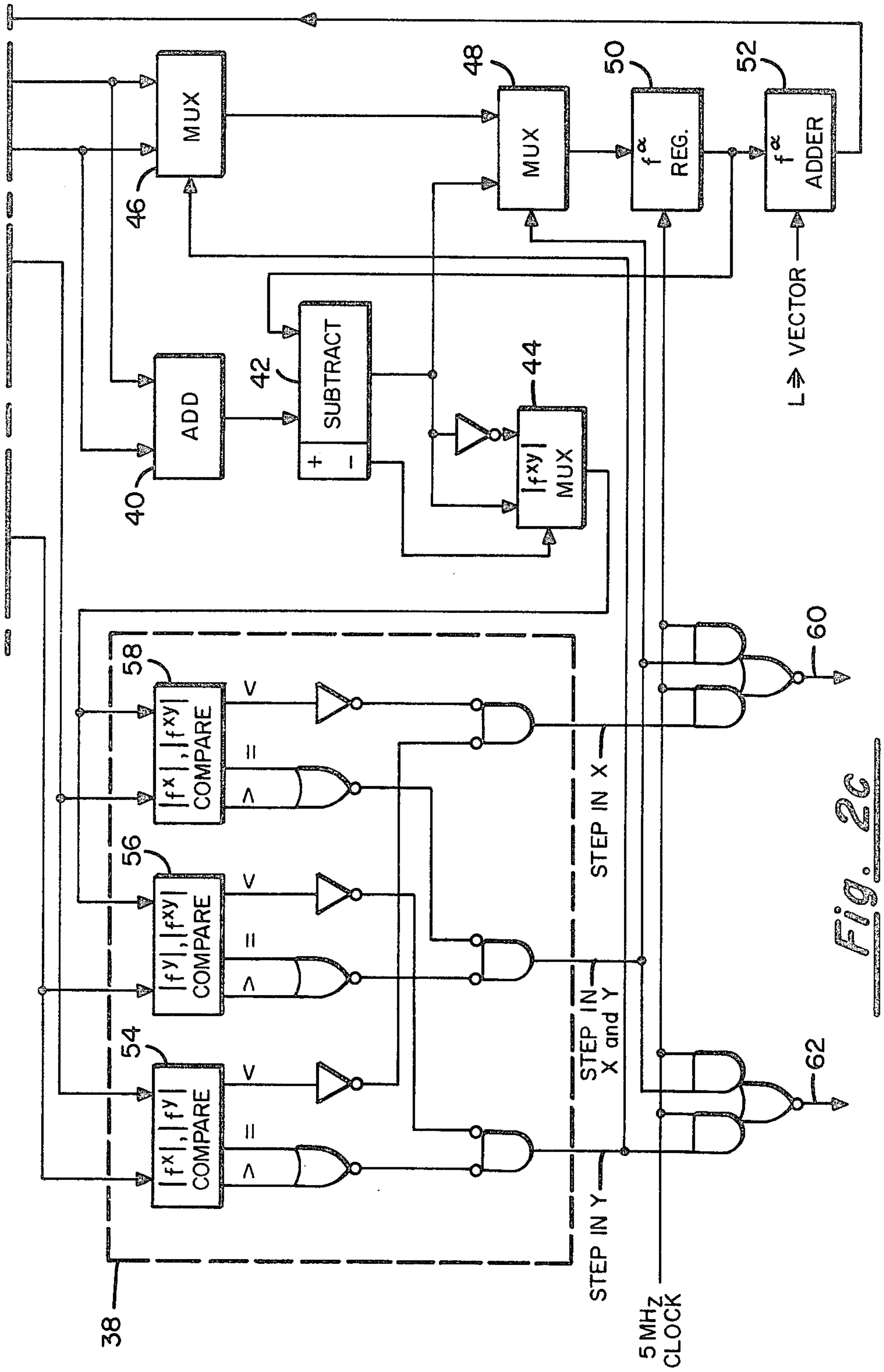

Referring to FIGS. 2 and 3, the operation of the graphics generator will now be described for the case of a vector which is to be displayed in the upper-right quadrant of the CRT. The generator is initiated by reading in data from a memory 1 containing the coordinates of the start point $x_o$, $y_o$ and the end point $x_e$, $y_e$ and indicating that a vector is to be displayed. If the character is to be displayed with greater magnification, the data when loaded through shift register 2 is shifted by one, two or three bit positions depending on whether the magnification is to be 2×, 4× or 8×. The coordinate data is then sequentially loaded into the $x_o$, $x_e$, $y_o$ and $y_e$ registers 4, 6, 8 and 10. The $x_o$ and $y_o$ registers 4 and 8 indicating the coordinates of the start point and the $x_e$ and $y_e$ registers 6 and 10 indicating the coordinates of the end point. A logic low or logic high is then loaded into the circle/vector register 12. In the present case a logic high is loaded which is indicative of a vector.

The coordinate data once loaded into the registers 4, 6, 8 and 10 is then loaded into the $x_e-x_o$ subtractor 14 and the $y_e-y_o$ subtractor 16 and the subtraction is performed. The results of this subtraction are then loaded into the $x_r$ and $y_r$ registers 18 and 20, and the sign bit of the $x_r$ and $y_r$ data is applied to the Δx, Δy sign multiplexer 22. The data stored in the $x_r$ and $y_r$ registers 18 and 20 represents offset vector end point coordinates with respect to the center of the CRT. After the $x_r$ and $y_r$ registers 18 and 20 are loaded, the determination of each sequential resolution point proceeds in the manner previously described until a 5 MHz clock initiates a new calculation.

The $x_r$ data is next applied to multiplexer 23 and the x to $x_r$ comparator 26 and the $y_r$ data is applied to multiplexer 24 and the y to $y_r$ comparator 28. Since the control to multiplexers 22, 23 and 24 is at a logic high, the multiplexers 23 and 24 apply the $x_r$ and $y_r$ data to the inputs of the $f^x$ and $f^y$ arithmetic chips 30 and 32. At the same time, the $f^\alpha$ data is applied on the other input to arithmetic chips 30 and 32 and either an addition or subtraction is performed depending on the control signal applied by the Δx, Δy sign multiplexer 22. In the specific case an addition will be performed by arithmetic chip 30 and a subtraction by arithmetic chip 32, since $\Delta x=+1$ and $\Delta y=-1$, and since initially $f^\alpha=0$, the functions reduce to $f^x=-x_r$ and $f^y=+y_r$. It is to be recognized, however, that for the next start point, $f^\alpha$ will correspond to a selected one of the determined values for $f^x$, $f^y$ or $f^{xy}$.

The $f^x$ and $f^y$ data determined by arithmetic chips 30 and 32 and their respective complements are next applied to the $|f^x|$ and $|f^y|$ multiplexers 34 and 36. The associated sign bits of $f^x$ and $f^y$ act as the multiplexers control to cause the absolute value of $f^x$ and $f^y$ to be impressed on the magnitude comparator circuitry 38.

As the values of $f^x$ and $f^y$ are applied to multiplexers 34 and 36, they are also applied to the $f^x+f^y$ adder 40. The addition of $f^x$ and $f^y$ is performed in adder 40 and the result is loaded into subtractor 42 where the value of $f^{xy}=(f^x+f^y)-f^\alpha$ is obtained. The $f^{xy}$ value determined by subtractor 42 and its complement is then loaded into the $|f^{xy}|$ multiplexer 44 with the sign bit of subtractor 42 acting as the control and causing the absolute value of $f^{xy}$ to be made available the magnitude comparator circuitry 38.

The values of $f^x$ and $f^y$ determined by arithmetic chips 30 and 32 are further applied to the $f^x$ or $f^y$ multiplexer 46 with the "step in y" logic signal of the magnitude comparator circuitry 38 acting as the control. The selected ($f^x$ or $f^y$) value is subsequently applied to the [($f^x$ or $f^y$) or $f^{xy}$] multiplexer 48 with the $f^{xy}$ value from multiplexer 42 and the "step in x and y" logic signal of the magnitude comparator circuitry 38 acting as the control. The value selected in multiplexer 48 is next loaded into the $f^\alpha$ register 50 and this value is made available to adder 42 for determining each successive $f^{xy}$.

The $f^\alpha$ value of register 50 is also loaded into the $f^\alpha$ adder 52, where an addition is performed prior to applying the output of adder 52 to the input of arithmetic chips 30 and 32. In the case of a vector, a logic zero is added to $f^\alpha$ in adder 52 for each calculation and the resultant $f^\alpha$ value is impressed on the arithmetic chips 30 and 32. When a circle is being displayed, a logic one is added to $f^\alpha$ and the resultant $(f^\alpha+1)$ value is used in determining the corresponding values of $f^x$ and $f^y$.

The comparator circuitry 38 responding to the absolute values of $f^x$, $f^y$ and $f^{xy}$ from multiplexers 34, 36 and 44 compares the absolute values of $f^x$, $f^y$ and $f^{xy}$ for the states of "greater than," "equal to" and "less than" to determine which is the smallest. Upon comparison of the absolute values of $f^x$, $f^y$ and $f^{xy}$ a logic high will be produced on the appropriate "step in x," "step in y" or "step in x and y" output. Upon the application of the 5 MHz clock signal to the output logic gates of outputs 60 and 62, the appropriate logic signals indicating an incremental step "in x" or "in y" or "in x and y" are produced.

The comparator circuitry 38 contains comparators 54, 56 and 58 which respectively compare $|f^x|$ to $|f^y|$, $|f^y|$ to $|f^{xy}|$ and $|f^x|$ to $|f^{xy}|$. A logic signal indicating a step in y is generated if the logic conditions $(|f^x| \geqq |f^y|) \odot (|f^{xy}| < |f^y|)$ are met. A logic signal indicating a step in x and y is generated if the logic conditions $(|f^x| \geqq |f^{xy}|) \odot (|f^y| \geqq |f^{xy}|)$ are met. A logic signal indicating a step in x is generated if the logic conditions $(|f^{xy}| > |f^x|) \odot (|f^y| > |f^x|)$ are met.

Referring to the $x_r$ and $y_r$ registers 18 and 20, it is to be noted that the outputs are also coupled to the one's complement counters 64 and 66, which counters are initially loaded with the coordinate values of the start point of the character to be displayed and which coordinates are updated by the successive incremental comparisons. The logic outputs 60 and 62 coupled to the counters 64 and 66 act as the control signals to increment or decrement the counters 64 and 66. The direction of the control (i.e., increment or decrement) is determined by the $\Delta x$, $\Delta y$ sign multiplexer 22. The output of counter 64 is coupled to the "x to $x_r$" comparator 26, the $(x+x_o)$ adder 68 and the multiplexers 22 and 24. The outputs of counter 62 is similarly coupled to the associated "y to $y_r$" coordinate comparator 28, $(y+y_o)$ adder 70, and multiplexers 23 and 22. The outputs of counters 64 and 66 thus indicate the x and y coordinates of the character's resolution points as they are recursively determined during the graphics generation.

In the case of a vector and only for the determination of the first resolution point, the counters are loaded with zeros by performing a master clear with the logic high from the circle/vector register 12, and thus as the counter counts for successive resolution points, the outputs indicate the x, y coordinates of the most current start point with respect to the center of the CRT. The outputs of 64 and 66 when added to the $x_o$ and $y_o$ coordinate values in adders 68 and 70 add back the offset previously subtracted out in subtractors 18 and 20 and the vector will be displayed in the appropriate position in the upper right quadrant.

As the determination of the coordinates of each of the resolution points continues in the above described incremental fashion, the updated outputs of counters 64 and 66 are impressed on the inputs to multiplexers 24 and 23; but with the control to the multiplexers held at the logic high from register 12, the $x_r$ and $y_r$ values of registers 14 and 16 are impressed on the inputs of arithmetic chips 30 and 32. As each counter 64 and 66 is updated, its output is further compared to the previously determined $x_r$ and $y_r$ values stored in registers 18 and 20 and when the respective x and y counts equal $x_r$ and $y_r$, the generation of the coordinates of the vector's resolution points is discontinued. New information can now be loaded from memory 1 for generation of the next graphics character.

Referring to FIGS. 2 and 4 in the case of a circle, the coordinate information loaded from memory 1 defines the center $x_o$, $y_o$ and a point $x_e$, $y_e$ on the circumference of the circle. The coordinates are again offset, and the $x_r$, $y_r$ coordinates stored in registers 18 and 20 now indicate a point on the circumference of the circle with respect to the center of the CRT. The values of $x_r$ and $y_r$ are again applied to the inputs of multiplexers 24 and 23 and additionally to counters 64 and 66. The count of the counters 64 and 66, however, are now preset to the values of the $x_r$ and $y_r$ coordinates stored in registers 18 and 20 since the control signal is a logic low, which ensures that the outputs of the counters correspond to points on the circumference of the circle. When the $x_o$, $y_o$ offset is added back in adders 68 and 70, the circle is therefore shifted back to and displayed in the proper position of the CRT.

It is also to be recognized that in the case of a circle the outputs of counters 64 and 66 wired to the inputs of multiplexers 24 and 23 are now selected as the inputs to arithmetic chips 30 and 32. The counter outputs are further wired to the multiplexers 24 and 23 so as to provide for the multiplication by "2" necessary in calculating $f^x$ and $f^y$ for the circle. This multiplication is accomplished by shifting the data one bit position on the inputs to the multiplexers 24 and 23. The logic low control signal from register 12 thus ensures that multiplexers 24 and 23 output the necessary 2x and 2y data to arithmetic chips 30 and 32. The arithmetic chips 30 and 32 now calculate the new $f^x = f^\alpha + 2x\Delta x + 1$ and $f^y = f^\alpha + 2Y\Delta y + 1$ values. It is to be further recognized that again $f^\alpha$ initially equals zero, since the start point $(x_r, y_r)$ is on the circumference; and that the adder 52 now adds a logic one to $f^\alpha$ for each calculation of $f^x$ and $f^y$. It is to be further recognized that the $\Delta x$ and $\Delta y$ values are now dependent on the sign bits of the x and y counters 60 and 66 selected by multiplexer 22 and are equal to either a $+1$ or a $-1$ depending on the relationship of x and y to the center of the CRT, and that circles are displayed in a clockwise fashion.

Referring to FIGS. 2 and 5 for the case of an arc, upon the loading of data from memory 1 it is also necessary to load the number of resolution points (N) that are to be determined for fixing the length of the arc. The number of resolution points (N) to be displayed are stored in register 72 and on the determination of each new start point, as the step in x or y or (x and y) information is clocked into counters 64 and 66, the M value in arc counter 74 is incremented by the same 5 MHz clock signal. When a match is achieved (M=N) in comparator 76, the arc generation is stopped. The display procedure for an arc thus proceeds in the same fashion as for a circle, but for a circle the generation of the successive coordinates continue until the values in counters 64 and 66 equal $x_r$ and $y_r$.

Upon the determination of the coordinates of each new incremental start point in the above manner for the vector, circle and arc, the digital values of adders 68 and 70 are converted to analog signals in digital-to-analog converters 78 and 80 and the analog signals are then used to drive the deflection circuitry of the CRT 82. The electron beam of CRT 82 thus traces out the individual graphics character (i.e., vector, circle or arc) on the monitor.

It is to be recognized that while the present graphics generation system has been described with respect to a stroke monitor, it is equally adaptable to a raster scan monitor and that other changes in form may be made without departing from the spirit and scope of the invention.

What is claimed is:

1. Signal generating means for generating signals corresponding to the x, y coordinates of a plurality of selected resolution points of an image displayed by said system, comprising:

first means for storing the x, y coordinates of a current one of said selected resolution points;

second means coupled to said first means for performing the Taylor's expansion of the function corresponding to said image at said current resolution point and at a plurality of resolution points incrementally displaced from said current resolution point and determining a plurality of values, each of said values associated with a respective one of said plurality of incrementally displaced resolution points;

third means coupled to said second means for comparing said plurality of values to determine that value which has the smallest absolute magnitude;

fourth means coupled to said first and third means for incrementing or decrementing the x, y coordinates of said current resolution point to establish the x, y coordinates of the next selected resolution point on said image, and next resolution point corresponding to the incrementally displaced resolution point having the smallest magnitude determined by said third means.

2. Signal generating means as set forth in claim 1 wherein said image is a circle and said second means comprises:

means for determining the values of $f^x = f^\alpha + 2y\Delta y + 1$, $f^y = f^\alpha + 2x\Delta x + 1$ and $f^{xy} = f^x + f^y - f^\alpha$, each of said values $f^x$, $f^y$ and $f^{xy}$ corresponding to the value of the Taylor's expansion of said circle at a respective one of said incrementally displaced resolution points, where $f^\alpha$ is the value of $f^x$, $f^y$ or $f^{xy}$ associated with said current resolution point, where $\Delta x$ and $\Delta y$ are the values of the incremental displacements in x and y from said current resolution point and where x and y are the values of the x, y coordinates of said current resolution point.

3. Signal generating means as set forth in claim 1 wherein said image is a vector and said second means comprises:

means for determining the values of $f^x = f^\alpha + x_r\Delta y$, $f^y = f^\alpha + y_r\Delta x$ and $f^{xy} = f^x + f^y - f^\alpha$, each of said values $f^x$, $f^y$ and $f^{xy}$ corresponding to the value of the Taylor's expansion of said vector at a respective one of said incrementally displaced resolution points, where $f^\alpha$ is the value of $f^x$, $f^y$ or $f^{xy}$ associated with said current resolution point, where $\Delta x$ and $\Delta y$ are the values of the incremental displacements in x and y from said current resolution point, and where $x_r$ and $y_r$ are the coordinate values associated with the x, y coordinates of the end point of said vector.

4. Signal generating means as set forth in claim 2 or 3 wherein said third means comprises:

means for determining whether $(|f^x| \geqq |f^y|) \odot (|f^{xy}| \geqq |f^y|)$ or
$(|f^x| \geqq |f^{xy}|) \odot (|f^y| \geqq |f^{xy}|)$ or
$(|f^{xy}| \geqq |f^x|) \odot (|f^y| \geqq |f^x|)$.

5. A graphics display system, comprising:

display means having a viewing screen with a plurality of resolution points for displaying an image comprised of selected ones of said resolution points;

first means for storing the x and y coordinates of a first and a second resolution point;

second means coupled to said first means and preset to a count corresponding to the x and y coordinates of either said first or said second resolution point for counting increments in x and y and for successively storing the coordinates of said selected resolution points;

means for recursively selecting said selected resolution points, comprising:

third means coupled to said first and second means for performing the Taylor's expansion of the function corresponding to said image at the selected resolution point stored in said second means and at a plurality of resolution points incrementally displaced from said selected resolution point stored in said second means and determining a plurality of values, each of said values associated with a respective one of said plurality of incrementally displaced resolution points;

fourth means coupled to said third means for comparing said plurality of values to determine that value which has the smallest absolute magnitude;

fifth means coupled to said second and fourth means for incrementing or decrementing the count of said second means to a count corresponding to the x and y coordinates of the resolution point having the smallest absolute magnitude, thereby updating said second means to contain the x and y coordinates of the next of said selected resolution points on said image;

sixth means coupled to said first and second means for comparing each successive count in said second means with the x and y coordinates of said second resolution point and stopping the recursive selection of said selected resolution points when a match occurs, thereby determining the shape of said image;

seventh means coupled to said second means and said display means for converting the successive counts of said second means to analog signals, said analog signals causing said display means to produce said image on said screen.

6. A graphics display system as set forth in claim 5 including means for stopping the recursive selection of said selected resolution points before said count in said second means matches the coordinates of said second point, thereby abbreviating the shape of said image.

* * * * *